(12) United States Patent
Dieudonne et al.

(10) Patent No.: US 10,101,634 B2
(45) Date of Patent: Oct. 16, 2018

(54) ADJUSTABLE SPEED FAST LASER SCANNING SYSTEM AND TWO-PHOTON MICROSCOPE ASSOCIATED

(71) Applicants: INSTITUT NATIONAL DE LA SANTE ET DE LA RECHERCHE MEDICALE (INSERM), Paris (FR); CENTRE NATIONAL DE LA RECHERCHE SCIENTIFIQUE (C.N.R.S), Paris (FR); ECOLE NORMALE SUPERIEURE, Paris (FR)

(72) Inventors: Stéphane Dieudonne, Paris (FR); Benjamin Mathieu, Paris (FR)

(73) Assignees: Institut National de la Sante et de la Recherche Medicale (INSERM), Paris (FR); Centre National de la Recherche Scientifique (C.N.R.S.), Paris (FR); Ecole Normale Superieure, Paris (FR)

(*) Notice: Subject to any disclaimer, the term of this patent is extended or adjusted under 35 U.S.C. 154(b) by 0 days.

(21) Appl. No.: 15/034,553

(22) PCT Filed: Nov. 7, 2014

(86) PCT No.: PCT/EP2014/074076
§ 371 (c)(1),
(2) Date: May 5, 2016

(87) PCT Pub. No.: WO2015/067772
PCT Pub. Date: May 14, 2015

(65) Prior Publication Data
US 2016/0274440 A1    Sep. 22, 2016

(30) Foreign Application Priority Data

Nov. 8, 2013 (EP) .................................. 13306533

(51) Int. Cl.
G02F 1/33 (2006.01)
G02F 1/35 (2006.01)
(Continued)

(52) U.S. Cl.
CPC ............. *G02F 1/33* (2013.01); *G02B 21/004* (2013.01); *G02B 21/0036* (2013.01);
(Continued)

(58) Field of Classification Search
CPC ............. G02B 21/0036; G02B 21/004; G02B 21/0076; G02B 21/0031; G02F 1/3526; G02F 2001/291; G02F 1/33
(Continued)

(56) References Cited

U.S. PATENT DOCUMENTS

| 4,827,125 A * | 5/1989 | Goldstein .......... G02B 21/0036 |
| | | 250/216 |
| 2002/0149769 A1* | 10/2002 | Roorda ................ G01N 21/645 |
| | | 356/318 |

(Continued)

FOREIGN PATENT DOCUMENTS

| EP | 0 361 653 A1 | 4/1990 |
| EP | 0 935 150 A1 | 8/1999 |
| WO | 2010/076579 A1 | 7/2010 |

OTHER PUBLICATIONS

Bechtold et al., "Beam shaping and high-speed, cylinder-lens-free beam guiding using acousto-optical deflectors without additional compensation optics", Optics Express, Jun. 12, 2013, p. 14627, vol. 21, No. 12.

*Primary Examiner* — Bumsuk Won
*Assistant Examiner* — Grant Gagnon
(74) *Attorney, Agent, or Firm* — W&C IP

(57) ABSTRACT

The present invention concerns a laser scanning system (18) comprising: —a first acousto-optical deflector (30) deflect-
(Continued)

ing a beam in a first direction (X) to obtain a first deflected beam and comprising a first acousto-optical crystal on which is applied an acoustic wave whose frequency varies over time according to a first law of command, and —a second acousto-optical deflector (32) deflected the first deflected beam in a second direction (Y), defining an angle comprised between 85° and 95° with the first direction, and comprising a second acousto-optical crystal on which is applied an acoustic wave whose frequency varies over time according to a second law of command, characterized in that the first law of command and the second law of command are chosen so that the average speed of the laser scanning system (18) is superior to 10 radians per second.

13 Claims, 3 Drawing Sheets

(51) Int. Cl.
    *G02B 21/00*     (2006.01)
    *G02B 27/00*     (2006.01)
    *G02F 1/29*     (2006.01)

(52) U.S. Cl.
    CPC ..... *G02B 21/0076* (2013.01); *G02B 27/0031* (2013.01); *G02F 1/3526* (2013.01); *G02F 2001/291* (2013.01)

(58) Field of Classification Search
    USPC .......................................................... 359/310
    See application file for complete search history.

(56)                 References Cited

U.S. PATENT DOCUMENTS

| | | | |
|---|---|---|---|
| 2005/0226557 A1* | 10/2005 | Trutna, Jr. | H01S 3/083 385/37 |
| 2011/0085221 A1* | 4/2011 | Ortyn | G02B 26/0858 359/200.8 |
| 2012/0212791 A1* | 8/2012 | Okada | G02B 21/002 359/202.1 |

\* cited by examiner

ADJUSTABLE SPEED FAST LASER SCANNING SYSTEM AND TWO-PHOTON MICROSCOPE ASSOCIATED

TECHNICAL FIELD OF THE INVENTION

The invention relates to a laser scanning system and a two-photon microscope comprising such laser scanning system.

BACKGROUND OF THE INVENTION

For imaging some biological phenomena such as the synaptic transmission, the scanning speed of a system used should be at least of the order of 2 meters per second. It is thus desirable to be able to scan a sample with a fast laser scanning system.

For this, it is known to use acousto-optic deflectors (often named after their acronym AOD) which are fast pointing devices based on the interaction between an acoustic compression wave propagating in an acousto-optical crystal and an electromagnetic wave. In most cases, the electromagnetic wave has a planar or a spherical wavefront. The resulting diffractive process deflects a fraction of the electromagnetic wave at an angle proportional to the acoustic frequency of the acoustic compression wave.

An acousto-optic deflector can be used as a scanning device by changing the acoustic frequency by elementary steps. However, each new acoustic frequency must propagate in the acousto-optical crystal throughout the region of interaction with the electromagnetic wave in order to fully redirect the electromagnetic power to the new angle. The characteristic time of switching associated is in the range of a few microseconds to several tens of microseconds. Thus, to acquire an image of a sample, a scanning device with an acousto-optic deflector would usually take several seconds. This time is prohibitive to efficiently acquire high resolution images.

It is known from U.S. Pat. No. 4,893,008 to drive a single acousto-optic deflector by a linear frequency chirp of slope s. The linear chirp produces a linear drift of the central frequency of the acousto-optic deflector and, thus, an angular scan of constant speed, proportional to s. The linear chirp also induces a lensing effect by introducing a cylindrical curvature of the wavefront of the electromagnetic wave. This lensing effect corresponds to a cylindrical lens of optical power proportional to s (according to the paraxial approximation). This lensing effect can be compensated by a cylindrical lens with a fixed focal lens.

However, the use of a fixed focal lens implies that the slope s is constant, which means that the scanning speed is fixed.

An acousto-optic scanning system known from document US-A-2002/0141035 which relies on two linear chirps of identical slopes propagated in opposite directions in a single acousto-optic crystal or in two separate acousto-optic crystal conjugated optically. The spatial gradients of frequencies are thus opposite, generating a lensing effect corresponding to two cylindrical lenses of opposite power (diverging and converging). The lensing effect is therefore cancelled, as long as the acousto-optic deflectors are perfectly conjugated optically, while the scanning speeds of each acousto-optic deflector are added.

But, this technique requires a tedious alignment of the various optical elements and induces a loss of power of the diffracted electromagnetic wave, resulting from the use of pairs of two acousto-optic successive interactions. Indeed, the deflection of the electromagnetic wave by the first acousto-optic interaction changes the incidence angle for the second acousto-optic interaction. This second interaction does no longer occur at the optimal angle (Bragg's angle), hence a loss in diffraction efficiency and transmitted power in the first diffraction order.

It is known from the article by Peter Bechtold et al. whose title is "*Beam shaping and high-speed, cylinder-lens-free beam guiding using acousto-optical deflectors without additional compensation optics*" (Optics Express, vol. 21, n° 12, 12 Jun. 2013) that using acousto-optical deflectors at high deflection speeds via acoustical frequency chirping induces astigmatism, deforming the laser beam in an unfavorable way. Within this paper, a method to prevent this effect for an ultrashort pulsed laser beam is presented via acoustical frequency jumps synchronized to the pulse-to-pulse pause. A method to calculate beam shaping capability of acousto-optical deflectors via arbitrary spatial frequency developments during ultrashort laser pulse transit through the deflector is also given. Cylinder-lens-free redirection at more than 2000 rad/s (if jumping from one end to the other end of the deflection range in one switch time) is demonstrated experimentally. However, continuous scan of the laser beam is not achievable in this way. In the experiments, the switching time between two beam shapes is equal to 1 microsecond ($\mu s$).

It is also known from document EP 0361 653 A1 a scanning system characterized by including acousto-optic means for deflecting a beam of electromagnetic radiation in first and second directions, wherein the system is configured for scanning the beam in third and fourth directions, which are inclined angularly relative to the first and second directions, by simultaneous operation of the first and second acousto-optic means.

SUMMARY OF THE INVENTION

The invention aims at solving the problems of the known laser scanning systems with a new laser scanning system which is tunable in scanning speed and in field of scan.

To this end, the invention concerns a laser scanning system comprising a first acousto-optical deflector adapted to deflect an input beam in a first direction to obtain a first deflected beam, the first acousto-optical deflector comprising a first acousto-optical crystal and a first transducer adapted to command the first acousto-optical crystal by applying a first acoustic wave having a variation in frequency over time according to a first law of command. The laser scanning system also comprises a second acousto-optical deflector adapted to deflect the first deflected beam in a second direction to obtain a second deflected beam, the second acousto-optical deflector comprising a second acousto-optical crystal and a second transducer adapted to command the second acousto-optical crystal by applying a second acoustic wave having a variation in frequency over time according to a second law of command. The first direction and the second direction define at least an angle comprised between 85° and 95°. The first law of command and the second law of command are chosen so that the speed of the laser scanning system is superior to 10 radians per second.

Thanks to the invention, the laser scanning system provides a way of carrying out a simple, precise and repeatable scanning of a sample with a tunable scanning speed. The values of speed which can be reached are, in addition, faster than the values reached by classical mechanical scanning devices such as resonant scanners or galvanometric mirrors.

According to further aspects of the invention which are advantageous but not compulsory, the laser scanning system might incorporate one or several of the following features, taken in any technically admissible combination:

- the two acousto-optic deflectors introduce a defocusing in the input beam and the laser scanning system comprises a compensating unit for compensating the defocusing introduced by the two acousto-optic deflectors.
- the compensating unit comprises a spherical lens and a translation device for modifying the position of the spherical lens with respect to the two acousto-optic deflectors.
- the angle, between the first direction and the second direction, is equal to 90°.
- the optical distance between the first acousto-optical crystal and the second acousto-optical crystal along the third direction is inferior to 15 millimeters (mm).
- the first law of command and the second law of command are chosen so that the speed of the laser scanning system is superior to 20 radians per second.
- the first law of command and the second law of command are chosen so that the speed of the laser scanning system is superior to 50 radians per second.
- the optical distance between the first acousto-optical crystal and the second acousto-optical crystal along a third direction orthogonal to the first direction and the second direction is inferior to 30 millimeters (mm).
- the optical distance between the first acousto-optical crystal and the second acousto-optical crystal along a third direction orthogonal to the first direction and the second direction is inferior to 15 millimeters (mm).
- the local averaged slope of the first law of command over time is comprised between 95% and 105% of a first constant value.
- the local averaged slope of the second law of command over time is comprised between 95% and 105% of a second constant value.
- the first constant value and the second constant value are equal.
- the first law of command and the second law of command are linear functions of time.
- the first law of command and the second law of command are step functions of time.
- for each law of command, the step functions are intervals of constant frequency separated by a step, each acousto-optic deflector has an optical resolution and the largest frequency step between two intervals of constant frequency is inferior to the highest of these optical resolutions.

The invention also concerns a two-photon microscope comprising a laser scanning system as previously described.

BRIEF DESCRIPTION OF THE DRAWINGS

The invention will be better understood on the basis of the following description which is given in correspondence with the annexed figures and as an illustrative example, without restricting the object of the invention. In the annexed figures.

DETAILED DESCRIPTION OF SOME EMBODIMENTS

For the remainder of the description, a longitudinal direction is defined: the longitudinal direction corresponds to the general direction of the propagation of light. Two transversal directions perpendicular to the longitudinal direction are also defined, the first transversal direction being further perpendicular to the second transversal direction. The longitudinal and transversal directions are respectively symbolized by an axis Z and axes X and Y on FIGS. 1 to 3.

Figure 1:
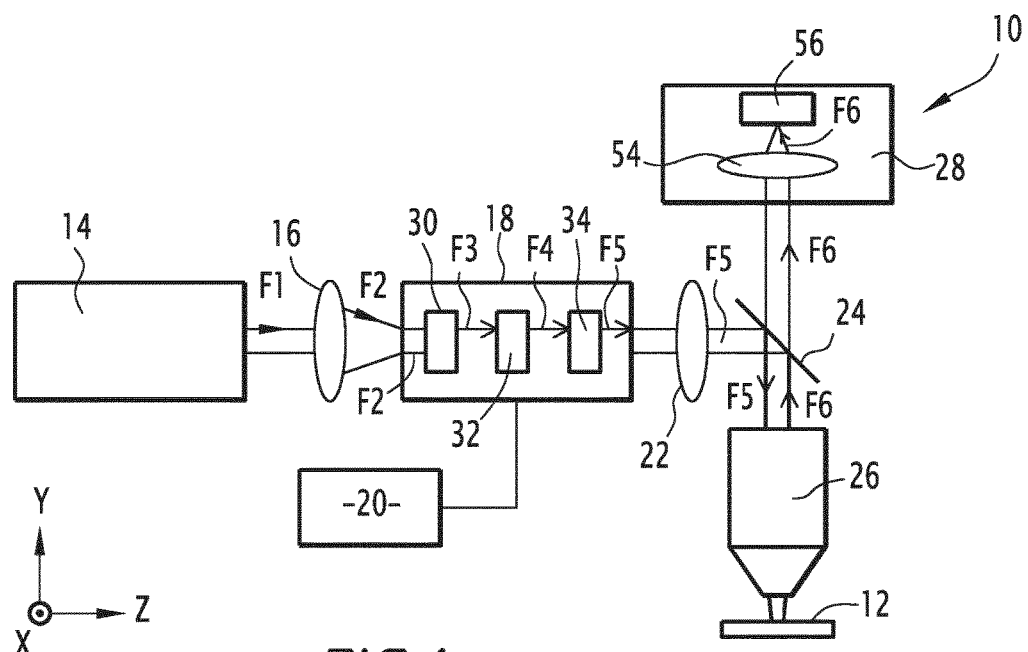
FIG. 1 is a schematic representation of a two-photon microscope according to the invention comprising a laser scanning unit commanded by laws of command.

A two-photon microscope 10 adapted to achieve a two-photon microscopy on a sample 12 is represented on FIG. 1.

The sample 12 is, for instance, a soft tissue. In the meaning of the present invention, a soft tissue is an organic tissue which can have an animal or vegetal origin. For instance, such a soft tissue can be a muscle or any portion of a human body, of an animal body or of a vegetable. A soft tissue can also be a non-metallic part of a prosthesis.

The microscope 10 comprises a laser unit 14, a first optical system 16, a laser scanning system 18, a radiofrequency power supply 20 of the laser scanning system 18, a second optical system 22, a beam splitter 24, an objective 26 and a detecting unit 28. The laser unit 14 is adapted to emit a laser beam. The laser unit 14 comprises a laser source. The laser source is adapted to emit a coherent light whose wavelength is comprised between 400 nanometers (nm) and 2 micrometers (μm). The laser source is preferably a femtosecond laser adapted to emit laser pulses with a duration comprised between 10 fs and 10 picoseconds (ps).

Preferably, the femtosecond laser is adapted to emit laser with a full width at half maximum strictly inferior to 10 picoseconds.

Alternatively, the laser unit 14 also comprises an element of spatial and/or temporal precompensation of the pulses emitted by the laser source. Such element is, for example, a prism or a grating or another acousto-optical deflector.

The first optical system 16 is adapted to make the laser beam emitted by the laser unit 14 propagate towards the laser scanning system 18.

The laser scanning system 18 is adapted to carry out a scan of the sample 12 in two dimensions.

The laser scanning system 18 comprises a first acousto-optical deflector 30, a second acousto-optical deflector 32 and a compensating unit 34.

The first acousto-optical deflector 30 is adapted to deflect an input beam in the first transverse direction X to obtain a first deflected beam. In other words, the first acousto-optical deflector 30 is adapted to carry out a scan of the sample 12 in the first transverse direction X.

The first acousto-optical deflector 30 comprises a first acousto-optical crystal 36, a first transducer 38 and a first casing 40 protecting the first acousto-optical crystal 36.

The first acousto-optical crystal 36 has a parallelepipedic shape, the light entering by a first input face 362 and leaving by a first output face 364.

The distance between the first input face 362 and the first output face 364 along the longitudinal direction Z is the thickness of the crystal.

The first acousto-optical crystal 36 is a crystal made in TeO$_2$. Any other material exhibiting acousto-optical properties may be considered.

The first transducer 38 is adapted to command the first acousto-optical crystal 36 by applying a first acoustic wave having a variation in frequency over time according to a first law of command L1.

The second acousto-optical deflector 32 is adapted to deflect the first deflected beam in the second transverse direction Y to obtain a second deflected beam. In other words, the second acousto-optical deflector 32 is adapted to carry out a scan of the sample 12 in the second transverse direction Y.

The first transverse direction X and the second transverse direction Y define at least an angle α comprised between 85° and 95°.

Figure 2:
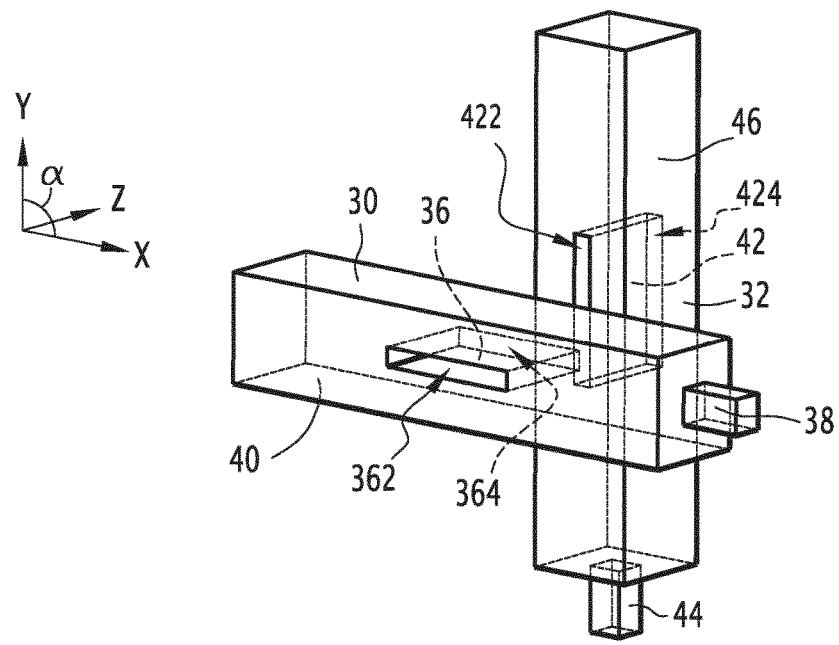
FIG. 2 is a perspective view of a part of the laser scanning unit of FIG. 1.
Figure 3:
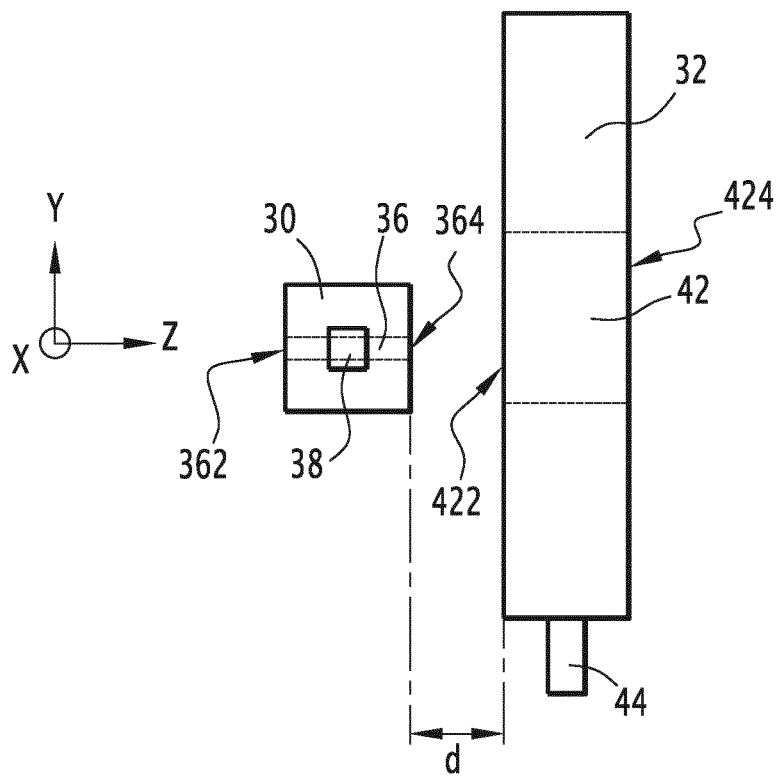
FIG. 3 is a side view of the part of the laser scanning unit represented in FIG. 2.

Preferably, as can be seen on FIGS. 2 and 3, the angle α is equal to 90°. Such configuration for the two acousto-optical deflectors 30, 32 is named a "crossed" configuration.

The second acousto-optical deflector 32 comprises a second acousto-optical crystal 42, a second transducer 44 and a second casing 46 protecting the second acousto-optical crystal 42.

The second acousto-optical crystal 42 has a parallelepipedic shape, the light entering by a second input face 422 and leaving by a second output face 424.

The distance between the second input face 422 and the second output face 424 along the longitudinal direction Z is the thickness of the crystal.

In the specific case illustrated, the second acousto-optical crystal 42 is identical to the first acousto-optical crystal 36.

The optical distance d between the first acousto-optical crystal 36 and the second acousto-optical crystal 42 along the longitudinal direction Z is as small as possible and in all cases such that the difference in position along the longitudinal direction Z of the theoretical focal points generated in the sample 12 by the lensing effects of the two acousto-optical deflectors 30, 32 be less than half of the diffraction-limited optical resolution along the longitudinal direction Z of the objective 26 under all conditions of scanning.

To fulfill this requirement, it is proposed that the optical distance d between the first acousto-optical crystal 36 and the second acousto-optical crystal 42 along the longitudinal direction Z be inferior to 30 millimeters (mm). This enables to limit the astigmatism of the lensing effect generated by the use of both acousto-optical deflectors 30, 32. By definition, the optical distance d is the distance between the first output face 364 and the second input face 422 in the absence of optical relay system. In such case, the optical distance d is the geometrical distance between the first output face 364 and the second input face 422.

In case an optical relay system is present, this optical relay system images the first output face 364 into a conjugate plane and the optical distance d12 is the distance from this image plane to the second input face 422.

According to a preferred embodiment of the invention, the optical distance d is inferior to 15 millimeters (mm).

The second transducer 44 is adapted to command the second acousto-optical crystal 42 by applying a second acoustic wave having a variation in frequency over time according to a second law of command L2.

Both acousto-optic deflectors 30, 32 generate a lensing effect which mainly results in a defocusing in the input beam. The compensating unit 34 is adapted to compensate the defocusing introduced by the two acousto-optic deflectors 30, 32.

According to the example of FIG. 1, the compensating unit 34 comprises a spherical lens and a translation device for modifying the position of the spherical lens with respect to the two acousto-optic deflectors 30, 32.

In an alternative embodiment, both acousto-optical crystals 40, 42 are in the same casing.

The radiofrequency power supply 20 or radiofrequency generator 20 of the laser scanning system 18 is adapted to provide, to each transducer 38, 44, radiofrequency waves. Each transducer 38, 44 is adapted to convert radiofrequency waves in an acoustic wave. Thus, the radiofrequency generator 20 is able to provide a first sequence of radiofrequency waves to the first transducer 38 corresponding to the first law of command L1. The radiofrequency generator 20 is also able to provide a second time-dependent radiofrequency wave to the second transducer 44 corresponding to the second law of command L2.

The radiofrequency generator 20 is a direct digital synthesizer. Such device (whose usual acronym is DDS) is a type of frequency synthesizer used for creating arbitrary waveforms from a single, fixed-frequency reference clock.

Alternatively, the radiofrequency generator 20 is an analog device.

The second optical system 22 is adapted to serve as an optical relay between the output of the laser scanning system 18 and the microscope 10. The second optical system 22 is, for instance, a 4f relay.

The beam splitter 24 is adapted to reflect the light issued from the laser scanning system 18 towards the objective 26 and to transmit the light collected by the objective 26 to the detecting unit 28. For instance, the beam splitter 24 is a dichroïc mirror.

Alternately, instead of the objective 26, any combination of lenses may be used.

The objective 26 is adapted to make the light received from the beam splitter 24 converge on a focal point situated in a focal plane located in the sample 12, to gather light emitted by the sample 12 and to send it to the beam splitter 24.

The objective 26 is an oil-immersion objective or water-immersion objective comprising a combination of several optical elements. The objective 26 provides a magnification usually ranging from 10 to 100 and a numerical aperture comprised between 0.5 and 1.4.

The detecting unit 28 comprises a third optical system 54 and a detector 56. The third optical system 54 is adapted to collect the light transmitted by the beam splitter 24 and to focus it on the detector 56. The detector 56 is adapted to convert the light received in an electrical signal. The detector 56 is, for instance, a photomultiplier.

Figure 4:
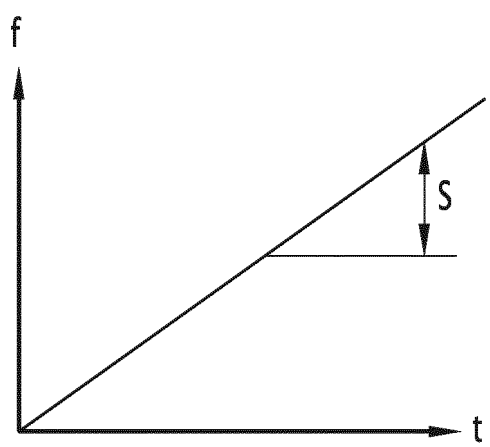
FIG. 4 is a graph representing the evolution over time of a law of command according to a first example.

Operation of the microscope 10 for two-photon imaging is now described when the first law of command L1 and the second law of command L2 applied are linear function of time, as in the first example of FIG. 4.

The laser unit 14 emits a first laser beam F1 towards the first optical system 16 which converts the first laser beam F1 into a second laser beam F2 whose waist is located in the laser scanning system 18. The second laser beam F2 can thus be considered as the input beam for the first acousto-optical deflector 30.

Then, the radiofrequency generator 20 applies a first sequence of radiofrequency waves to the first transducer 38 such that the first law of command L1 be a linear function of time. Simultaneously, the radiofrequency generator 20 applies a second sequence of radiofrequency waves to the second transducer 44 such that the second law of command L2 be a linear function of time. In this example, the two linear functions of time S share the same slope named and are represented on FIG. 4. This slope S is the temporal gradient of frequency or the value of the local averaged slope of frequency over time. In case the function is continuous over time, the local averaged slope of the function at an instant is equal to the value of the derivative of the function at the same instant.

The first acousto-optical deflector 30 deflects the second laser beam F2 by a first angle of deviation in the first transverse direction X. This first deflected beam is labeled F3. With time, the first angle of deviation gets more and more important.

It can be shown that when the first law of command L1 is a linear function of time, the lensing effect generated by the first acousto-optical deflector 30 corresponds to a first cylindrical lens with a first power.

The first deflected beam F3 propagates towards the second acousto-optical deflector 32.

The second acousto-optical deflector 32 deflects the first deflected beam F3 by a second angle of deviation in the second transverse direction Y. This second deflected beam is labeled F4. With time, the second angle deviation gets more and more important.

It can be shown that when the second law of command L2 is a linear function of time, the lensing effect generated by the second acousto-optical deflector 32 corresponds to a second cylindrical lens with a second power.

The second power is identical to the first power since the slope of the first law of command L1 and the slope of second law of command L2 are the same.

Figure 5:
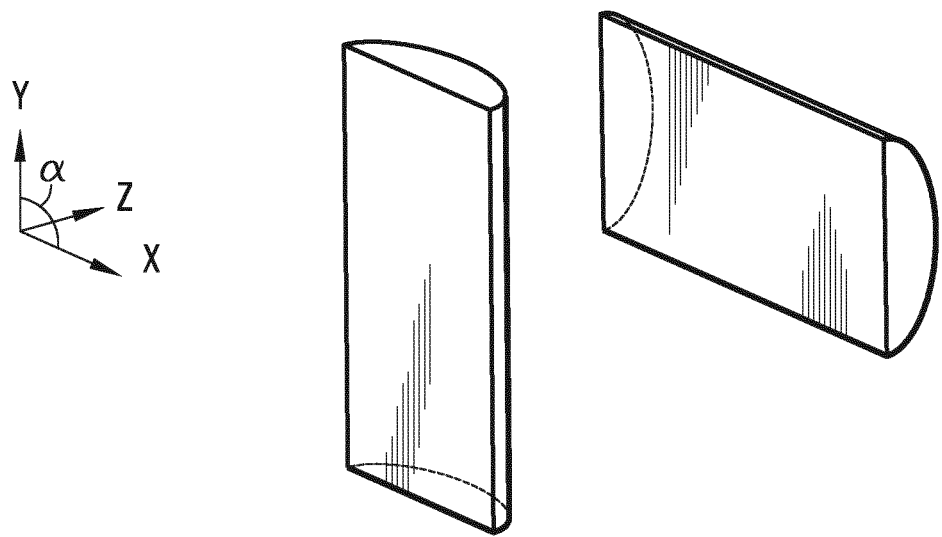
FIG. 5 is a perspective view of an optical system equivalent to the lensing effect generated by the part of the laser scanning unit represented in FIG. 2 when laws of command according to the first example are applied to the laser scanning unit.

Thus, the lensing effect generated by both acousto-optical deflectors 30, 32 is equivalent to the optical system illustrated on FIG. 5. This optical system comprises a first cylindrical lens adapted to focus light along the first transverse direction X and a second cylindrical lens adapted to focus light along the second transverse direction Y. This equivalent optical system therefore behaves like a spherical lens having the power of the two cylindrical lenses. This power causes an axial displacement of the focal plane in the sample or defocusing to be compensated.

The second deflected beam F4 then propagates towards the compensating unit 34, which is a spherical lens, so as to obtain a fifth laser beam F5 in which the defocusing generated by both acousto-optical deflector 30, 32 is compensated.

The fifth laser beam F5 propagates towards the objective 26 via the second optical system 22 which serves as a relay and reflects on the beam splitter 24.

The objective 26 makes the fifth laser beam F5 convergent on the focal point of the focal plane in the sample 12.

Because the slope S is identical for both acousto-optical deflectors 30, 32, the focal point is scanned along the direction of the diagonal of the field of view of the objective 26. The initial frequencies applied to the two acousto-optical crystals 36, 42 set the point of origin of the diagonal scanning line, which can thus be displaced at will over the desired scanning area in the sample 12.

As two-photon microscopy relies on the two-photon absorption phenomena predicted by Göpert-Mayer in 1931, at the focal point, an interaction between the sample 12 and light occurs by simultaneous absorption of pairs of photons of the fifth laser beam F5 by the sample 12. Following most of these biphotonic absorption events, the sample 12 emits one photon by fluorescence. The wavelength of the photon emitted is larger than half the wavelength of the photons of one pair.

The objective 26 then gathers the fluorescence light emitted by the sample 12 so as to form a sixth laser beam F6.

The beam splitter 24 transmits the sixth laser beam F6 towards the detecting unit 28.

The third optical system 54 makes the sixth laser beam F6 converge on the detector 56 which converts the sixth laser beam F6 in an electrical signal. This electrical signal contains information relative to the arrangement of sample 12 in space. Based on the electrical signal, an image of the sample 12 in the focal point can thus be reconstituted point by point according to the diagonal scanning pattern. The reconstitution has been shown by the applicant for a scanning speed up to 500 radians per second.

The laser scanning system 18 enables to scan the sample 12 with a speed commanded by the first law of command L1 and the second law of command L2. As the slope S can be freely chosen, the scanning speed can be set to any arbitrary value, as long as the compensating unit 34 can compensate for the defocusing created by the equivalent spherical lens 50. Thus, the scanning speed of the laser scanning system 18 is tunable.

Furthermore, the laser scanning system 18 is easy to implement since only two acousto-optical deflectors 30, 32 are involved.

Figure 6:
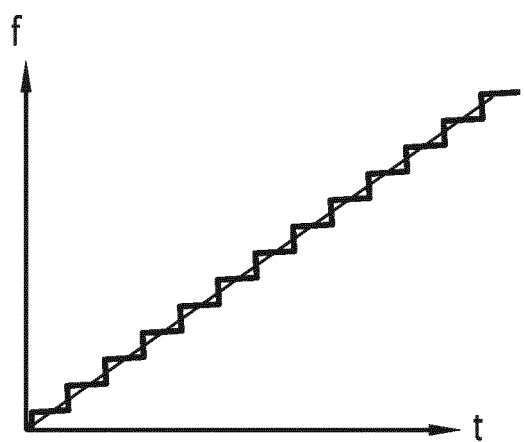
FIG. 6 is a graph representing the evolution over time of a law of command according to a second example.

According to a second example, the first law of command L1 and the second law of command L2 are step functions of time, as represented on FIG. 6. A step function comprises several intervals of constant frequency separated by a step. Each acousto-optical deflector 30, 32 has an optical resolution. To minimize the degradation of the spatial resolution, the largest frequency step between two intervals of constant frequency should remain inferior to the highest one of the two optical resolutions of the acousto-optic deflectors 30, 32. By this expression, it is meant that the largest frequency step between two intervals of constant frequency should remain inferior to the frequency value corresponding to the highest one of the two optical resolutions of the acousto-optic deflectors 30, 32.

Operation of the microscope 10 for two-photon imaging when the first applied law of command L1 and the second applied law of command L2 are step functions of time as in the second example of FIG. 6 is similar to the operating of the microscope 10 previously presented because the local averaged slope of each law of command L1, L2 over time is similar. Therefore, the operating of the microscope 10 is mainly determined by the behavior of the local averaged slope of each law of command L1, L2 over time.

Thus, by extension, many laws of command L1 and L2 enables to obtain an operating of the microscope 10 which is adapted for two-photon imaging provided the behavior of the local averaged slope of each law of command L1, L2 be adapted.

Preferably, the local averaged slope of the first law of command L1 over time is comprised between 95% and 105% of a first constant value. This enables that the lensing effect, generated by the first acousto-optical deflector 30 alone, substantially corresponds to the effect of a first cylindrical lens with a constant power linked to the first constant value.

Preferably, the local averaged slope of the second law of command L2 over time is comprised between 95% and 105% of a second constant value. This enables that the lensing effect, generated by the second acousto-optical deflector 32 alone, substantially corresponds to the effect of a second cylindrical lens with a constant power linked to the second constant value.

Preferably, the first constant value and the second value are the same so as to ensure that the lensing effect generated by both acousto-optical deflectors 30, 32 be close to the behavior of a spherical lens.

Advantageously, the first law of command L1 and the second law of command L2 are chosen so that the speed of the laser scanning system 18 is superior to 10 radians per second, preferably 20 radians per second, more preferably 50 radians per second.

The speed of the laser scanning system 18 is the scanning speed. A scanning speed implies that a surface is scanned by a laser in a plurality of contiguous points with time. The angular speed for following the path linking said points on the surface is the scanning speed.

Such scanning speed differs from the deflecting speed of an acousto-optical deflector. Indeed, such deflecting speed is equal to the ratio between the deflecting angle imposed by an acousto-optical deflector and the duration between the time when the generator starts to apply an acoustic wave at an extremity of the crystal and the time when the beam is actually deflected.

It should be understood that various law of commands L1 and L2 fulfill this criteria Linear functions of time with the same slope constitute a specific example. However, in some circumstance, it may be desirable that the first law of command L1 and the second law of command L2 be different. It is notably the case if the optical distance d is not small.

According to another embodiment, the compensating unit 34 is a translation device for modifying the position of the objective 26 with respect to the two acousto-optic deflectors 30, 32.

The defocusing introduced by the two acousto-optic deflectors 30, 32 is given by the following formula:

$$|\Delta z| = \frac{F}{\tan\left(\arcsin\left(\frac{NA}{n}\right)\right)} * \Delta\theta = \frac{F}{\tan\left(\arcsin\left(\frac{NA}{n}\right)\right)} * \frac{\lambda \cdot R_{obj} \cdot \frac{df}{dt}}{v^2 \cdot M^2}$$

wherein:

$\Delta z$ is the defocusing introduced by the two acousto-optic deflectors;

F is the focal distance of the objective 26;

NA is the numerical aperture of the objective 26;

n is the refractive index of the medium of immersion of the objective 26;

$\Delta\theta$ is the angular variation between the ray entering at the center of the objective 26 aperture and the ray passing at the edge of its effective back-aperture;

$\lambda$ is the mean wavelength of the laser unit 14;

$R_{obj}$ is the radius of the back aperture of the infinity-corrected objective 26;

$\frac{df}{dt}$ is the acoustic frequency chirp slope;

v is the propagation speed of the acoustic wave in the acousto-optical deflector, and M is the magnification of the second optical system 22, M being given by the formula $$M = \frac{R_{obj}}{R_{AO}}$$

wherein $R_{AO}$ is a the radius of the second acousto-optical deflector 32 optical aperture.

This formula accounts for the large convergence angles under the objective 26 and is therefore more precise than the paraxial approximation obtained by standard lens conjugation formulas.

Thus, by translating the translation device for modifying the position of the objective 26 along the optical axis by a quantity of $-\Delta z$, the defocusing introduced by the two acousto-optic deflectors 30, 32 is compensated.

Alternatively, the compensating unit 34 comprises adaptive optics such as a deformable mirror. Adaptive optics is notably interesting so as to compensate any optical aberration the laser scanning system 18 can generate in the focal plane.

Notably, such optical aberration to compensate can be astigmatism. Indeed, in reality, the equivalent optical system represented on FIG. 5 is a spherical lens exhibiting an astigmatism defect since the distance d between the two acousto-optic crystals 36, 42 is not zero.

According to another embodiment of the laser scanning system 18, the laser scanning system 18 is deprived of compensating unit 34. Indeed, if it is desired to image any focal plane of the sample 12, there is no need to compensate for the defocusing generated by both acousto-optical deflector 30, 32.

Additionally, although the laser scanning system 18 has been presented for an application related to two-photon fluorescence microscopy, the laser scanning device 18 can also be used for any measurement at the focal point, such as transmission, fluorescence, refraction, polarization, scattering of reflection. In such cases, the beam splitter 24 may not be present and the detector unit 28 may be different.

The embodiments and alternative embodiments considered here-above can be combined to generate further embodiments of the invention.

The invention claimed is:

1. A microscope comprising a laser scanning system comprising:

a first acousto-optical deflector adapted to deflect an input beam in a first direction to obtain a first deflected beam, the first acousto-optical deflector comprising a first acousto-optical crystal and a first transducer adapted to command the first acousto-optical crystal by applying a first acoustic wave having a variation in frequency over time according to a first law of command, a second acousto-optical deflector adapted to deflect the first deflected beam in a second direction to obtain a second deflected beam, the first direction and the second direction define at least an angle comprised between 85° and 95° and the second acousto-optical deflector comprising a second acousto-optical crystal and a second transducer adapted to command the second acousto-optical crystal by applying a second acoustic wave having a variation in frequency over time according to a second law of command, the two acousto-optic deflectors introducing a defocusing in the input beam and the first law of command and the second law of command being chosen so that the speed of the laser scanning system is superior to 10 radians per second, and a compensating unit for compensating the defocusing introduced by the two acousto-optic deflectors, the compensating unit comprising a spherical lens and a translation device for modifying the position of the spherical lens with respect to the two acousto-optic deflectors.

2. The laser scanning system according to claim 1, wherein the angle, between the first direction and the second direction, is equal to 90°.

3. The laser scanning system according to claim 1, wherein the local averaged slope of the second law of command over time is comprised between 95% and 105% of a second constant value.

4. The laser scanning system according to claim 1, wherein the first law of command and the second law of command are linear functions of time.

5. A two-photon microscope comprising a laser scanning system according to claim 1.

6. The laser scanning system according to claim 1, wherein the first law of command and the second law of command are chosen so that the speed of the laser scanning system is superior to 20 radians per second.

7. The laser scanning system according to claim 6, wherein the first law of command and the second law of command are chosen so that the speed of the laser scanning system is superior to 50 radians per second.

8. The laser scanning system according to claim 1, wherein the optical distance between the first acousto-optical crystal and the second acousto-optical crystal along the third direction is inferior to 30 millimeters.

9. The laser scanning system according to claim 8, wherein the optical distance between the first acousto-optical crystal and the second acousto-optical crystal along the third direction is inferior to 15 millimeters.

10. The laser scanning system according to claim 1, wherein the local averaged slope of the first law of command over time is comprised between 95% and 105% of a first constant value.

11. The laser scanning system according to claim 10, wherein the local averaged slope of the second law of command over time is comprised between 95% and 105% of a second constant value, and wherein the first constant value and the second constant value are equal.

12. The laser scanning system according to claim 1, wherein the first law of command and the second law of command are step functions of time.

13. The laser scanning system according to claim 12, wherein for each law of command, the step functions are intervals of constant frequency separated by a step, wherein each acousto-optic deflector has an optical resolution and wherein the largest frequency step between two intervals of constant frequency is inferior to the highest of these optical resolutions.

* * * * *